United States Patent
Maddali et al.

(10) Patent No.: US 8,495,686 B2
(45) Date of Patent: Jul. 23, 2013

(54) METHOD AND APPARATUS FOR CONTROLLING A SET TOP BOX OVER A WIRELESS ADHOC CONNECTION

(75) Inventors: Balamuralidhar Maddali, Chennai (IN); T. Sahaya George, TamilNadu (IN); Madan Kanth Lanka, Andhra Pradesh (IN); Thalha Yasir Refaye, Chennai (IN); Mahendra Nimishakavi, Hyderabad (IN); Vasanthakumar Sarpasayanam, Pondicherry (IN); Sivasankari S. Vekataramamoorthy, Chennai (IN); Naman Patel, Gujarat (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 144 days.

(21) Appl. No.: 12/978,883

(22) Filed: Dec. 27, 2010

(65) Prior Publication Data

US 2012/0162537 A1   Jun. 28, 2012

(51) Int. Cl.
*H04N 7/18*   (2006.01)

(52) U.S. Cl.
USPC .............................. 725/81; 725/133; 709/219

(58) Field of Classification Search
USPC ....... 725/87–118, 78–85, 131–134, 139–142; 709/217–232
See application file for complete search history.

(56) References Cited

U.S. PATENT DOCUMENTS

| | | | |
|---|---|---|---|
| 6,886,095 B1* | 4/2005 | Hind et al. | 713/168 |
| 6,996,837 B1* | 2/2006 | Miura et al. | 725/78 |
| 7,209,916 B1* | 4/2007 | Seshadri et al. | 1/1 |
| 7,801,953 B1* | 9/2010 | Denman et al. | 709/204 |
| 8,090,890 B2* | 1/2012 | Rofougaran | 710/304 |
| 8,131,645 B2* | 3/2012 | Lin et al. | 705/51 |
| 8,285,123 B2* | 10/2012 | Yuasa | 386/294 |
| 2012/0101944 A1* | 4/2012 | Lin et al. | 705/44 |

* cited by examiner

*Primary Examiner* — Annan Shang

(57) ABSTRACT

An approach is provided for controlling a set top box on an ad hoc basis. A wireless device detects a mobile terminal that is configured to control one or more set top boxes via a wireless local area network. The wireless device controls, over an adhoc connection, the one or more set top boxes directly or via the mobile terminal based on the detection of the mobile terminal.

20 Claims, 10 Drawing Sheets

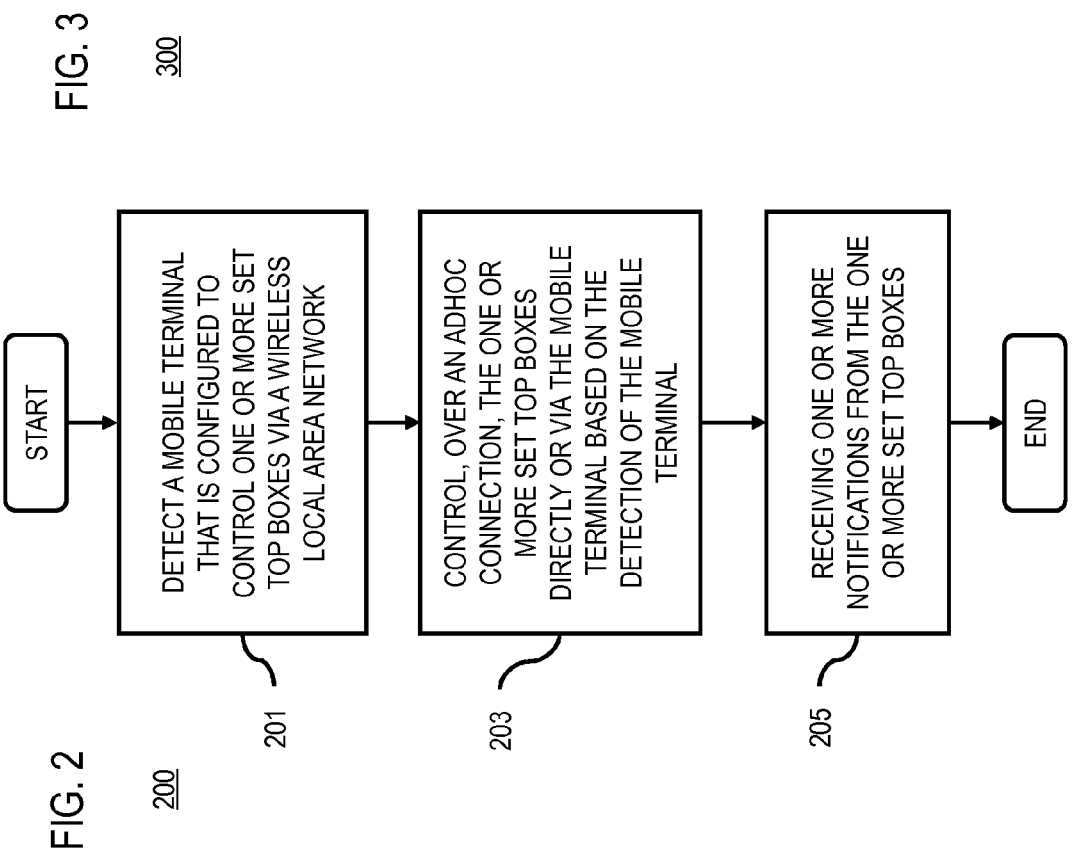

METHOD AND APPARATUS FOR CONTROLLING A SET TOP BOX OVER A WIRELESS ADHOC CONNECTION

BACKGROUND INFORMATION

Wireless networking technologies offer users the convenience of mobility and ease of connection to a network. Concurrently, media services have enjoyed great success in other industries, such as portable media devices (e.g., personal digital assistants (PDAs), MP3 players, mobile phones, etc.), audio streaming services, video streaming, etc. Television remains the prevalent global medium for entertainment and information. However, the increasing number of personal devices in the proximity of a set top box introduces potential issues of determining which one of the near-by user devices should dominate the control of the set top box. There has been little or no coordination of such devices to avoid this control issue. Therefore, there is a need for an approach to provide coordination among user devices for control of a set top box and other telecommunications and media services.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 2 is a flowchart of a process for a wireless adhoc device to detect a user device that controls a set top box, according to an exemplary embodiment;

FIG. 3 is a flowchart of an authentication process for establishment of a wireless adhoc connection, according to an exemplary embodiment;

DESCRIPTION OF THE PREFERRED EMBODIMENT

A preferred apparatus, method, and system for controlling a set top box over a wireless adhoc connection are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE). Furthermore, although the control over a STB is explained in the context of via a mobile terminal, it is contemplated that the control over the STB can be preformed via other user devices relating to various services and functions.

Figure 1:
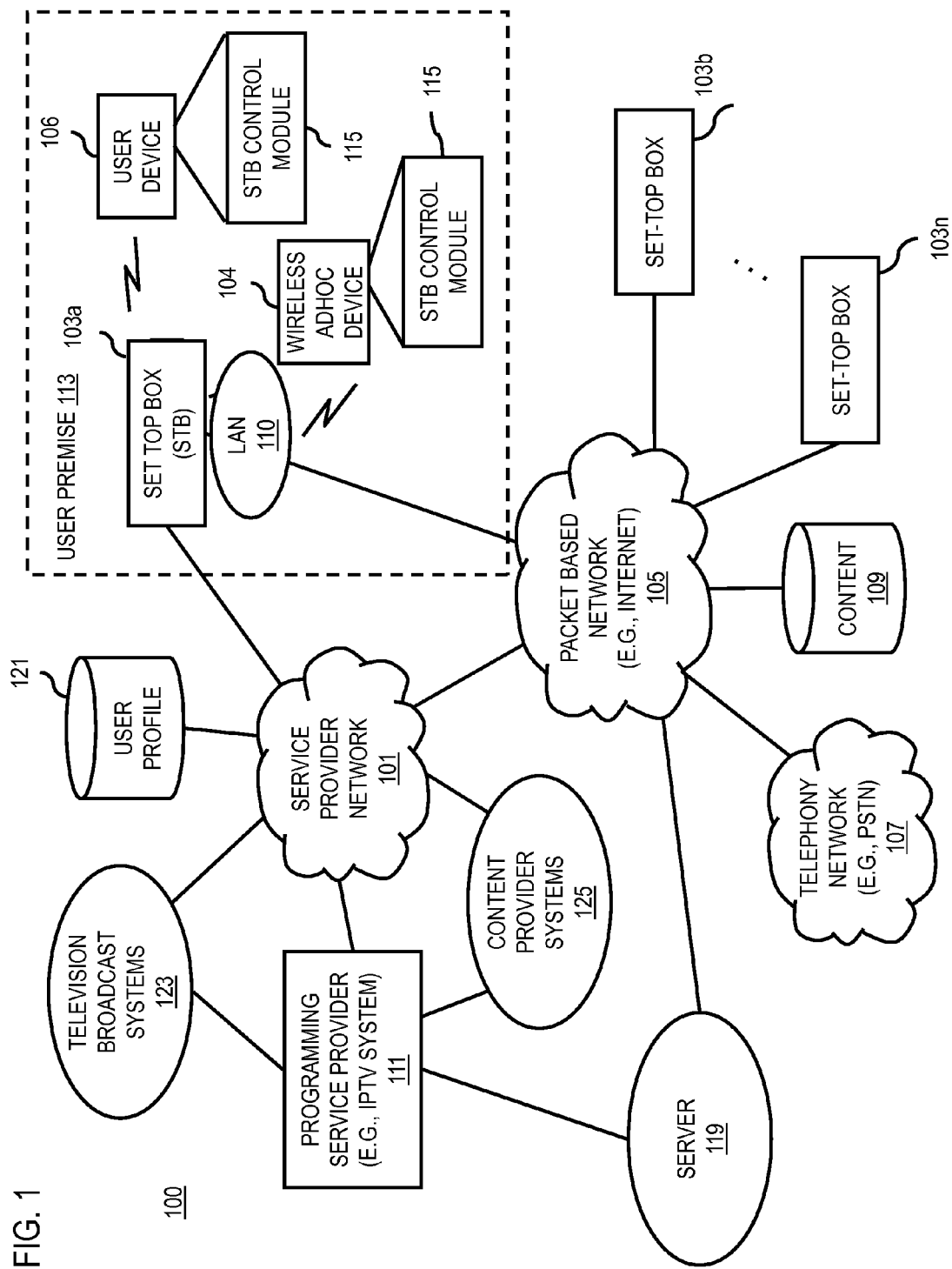
FIG. 1 is a diagram of a system capable of providing control of a set top box (STB) over a wireless adhoc connection, according to an exemplary embodiment.

FIG. 1 is a diagram of a system capable of providing control of a set top box (STB) over a wireless adhoc connection, according to an exemplary embodiment. For the purpose of illustration, system 100 for a user device 106 (e.g., a computing device (or terminal)) to control content processing devices 103a-103n (e.g., set-top boxes (STBs)) via another user device, denoted as "wireless adhoc device." As will be more fully described with respect to FIGS. 2 and 3, the wireless adhoc device 104 facilitates establishment of adhoc connections with the content processing device 103a, for instance, by acting as a controller to detect eligible devices (e.g., a user device 106) for remotely controlling the content processing device 103a. In certain embodiments, it is contemplated any user device can be designated or assume by itself the role of "adhoc device."

The system 100 includes a service provider network 101 that integrates the television medium with that of the telecommunications, computing, and media environments, thereby broadening the scope of devices and sources available to individuals for obtaining programming content or other media. By way of example, the service provider network 101 provides programming content that may include any audio-visual content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, songs, audio books, etc.), Internet-based content (e.g., streamed video, streamed audio), and/or any other equivalent media form. Within user premise 113, content processing device 103a can communicate with the wireless adhoc device 104 over a local area network (LAN) 110. Also, user device 106 can communicate directly with STB 103a using a peer-to-peer wireless connection (e.g., wireless fidelity (Wi-Fi)) or over LAN 110 to control the STB 103a. In this manner, user devices 106 allow users to control STB 103a to, for example, select a content item from a shared library and then play the selected content item.

In some embodiments, interactions with the set top boxes 103a-103n include detection and/or reception of media signals, actions or activities associated with interactive media (such as audio applications, video applications, gaming applications, etc.). The user device 106, according to various embodiments, may be any type of computer device or mobile device having the capability to support data communications via software, firmware, and/or hardware. Computer devices may include desktop computers, notebook computers, servers, terminal workstations, gaming systems, customized hardware, or other equivalent apparatus. Mobile devices may include wireless telephones, cellular telephones, satellite telephones, personal digital assistants (PDA), pocket personal computers, smart phones, tablets, handsets, portable gaming systems, and customized hardware, as well as other mobile technologies capable transmitting data.

Under the scenario of FIG. 1, STBs 103a-103n and/or a wireless adhoc device 104 can communicate using a packet-based network 105 and/or a telephony network 107. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (Wi-Fi) networks, other wireless networks (e.g., 3 G wireless broadband networks, mobile television networks, radio networks, etc.), terrestrial broadcasting networks, provider specific networks (e.g., a Verizon® FiOS® network, a TiVo network, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect the STBs 103a-103n to various sources of media content. Although depicted in FIG. 1 as separate networks, the packet-based network 105 and/or the telephony network 107 may be completely or partially contained within the service provider network 101. For example, the service provider network 101 may include facilities to provide for transport of packet-based and/or telephony communications.

It is observed that even with the advent of the Internet and high-speed data connections, television remains the prevalent global medium for entertainment and information. In fact, as traditional television programming (e.g., "over-the-air" programming, cable programming, satellite programming, etc.) merges with the online content (e.g., network-streamed content, on-demand content, Internet programming, media-sharing websites, etc.), the available programming choices are likely to continue to grow without any true bounds. It is also recognized that the versatility of user devices, such as mobile phones equipped with cameras and audio/video players, mobile media readers, have concurrently used by users in the proximity of a set top boxes trying to gain control of the set top box. However, no coordination is available among user devices to gain control over the set top box. Such problem stems, in part, from the lack of connectivity between the user devices and set top boxes. Moreover, there has not been any development regarding the protocol mechanisms to facilitate the convenient and efficient transfer of data. With respect to user devices, such as mobile communication devices (particularly those that support both cellular and wireless networking interfaces), these devices are continually available to support voice communications. As mentioned, no coordination between these devices and set top boxes exists, and thereby imposing the inconvenience to users of having to manually coordinate the control over the set top box.

To address this problem, the system 100 of FIG. 1 enables the detection of a first user device that controls of a set top box and the control by another user device over the set top box via the first user device. In one embodiment, a second user device, e.g., a mobile reader can instruct the first user device, e.g., a mobile phone, to control a set top box, for example, to adjust the volume of a TV display.

This control setup approach enables users to establish wireless ad hoc connections to one or more set top boxes (STBs) from one or more user devices via one or more mobile remotes controlling the STBs in the same wireless network. The connections are ad hoc because they do not rely on a preexisting infrastructure, such as routers in wired networks or access points in managed (infrastructure) wireless networks. Instead, each node participates in routing can forward data to other nodes, and the determination of which nodes forward data is made dynamically based on the network connectivity. The device that facilitates the establishment of the adhoc connections is deemed a wireless adhoc device (WAD). In certain embodiments, such wireless adhoc devices can operate in the following modes: wireless adhoc device controller (WADC), wireless adhoc device listener (WADL), and wireless adhoc device controller/listener (WADCL). In the controller mode, the device itself behaves as a STB controller, while in the listener mode, the device is configured to only receive notifications from the STB 103a. The third mode provides a combination of functions of the controller and listener.

As discussed previously, media or programming content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the programming service provider 111 may provide (in addition to the provider's own programming content) content obtained from other sources, such as one or more television broadcast systems 123, one or more third-party content provider systems 125, content residing in a repository 109 or accessible via a server 119, as well as available via one or more packet-based networks 105 or telephony networks 107, etc.

The STBs 103a-103n may be used alone or in combination with one or more wireless adhoc devices 104 to implement various exemplary embodiments relating to receiving commands that are call event driven from the user device 106. Under such implementation, the set-top boxes 103a-103n may be within a common user premise, as in a multi-room arrangement of STBs. The user device 106 and the wireless adhoc device 104 can employ a STB control module 115, which is configured to send control signals or messages for the set top box 103a regarding instructions to execute various functions. The STB control module 115 can also provide voice recognition capability to convert speech or voice into text data, which is then used to generate an STB command. For example, if the wireless adhoc device 104 detects that the user device 106 is controlling the STB 103a, the wireless adhoc device 104 can send to the STB 103a via the user device 106 a series of commands, for instance, to reduce or mute the volume and pause the program that is being viewed. As will be more fully described later, the wireless adhoc device 104 (assuming so configured to communicate wirelessly) can wirelessly (e.g., using User Datagram Protocol (UDP)) detect presence of the user device 106 via a broadcast message. With UDP, computer applications can send messages or datagrams to other hosts on an Internet Protocol (IP) network without requiring prior communications to set up special transmission channels or data paths.

In one embodiment, the user device 106, as the controller, can authenticate whether the wireless adhoc device 104 has the right to control the set top box 103*a*, and transmit STB instructions or commands the STB 103*a* after acknowledging the authentication. If no user device 106 is controlling over the STB 103*a*, the wireless adhoc device 104 can wirelessly detect presence of the STP 103*a* via a broadcast message. The STB 103*a* authenticate whether the wireless adhoc device 104 has right to control the set top box 103*a*, and receive STB instructions or commands directly from the wireless adhoc device 104 after acknowledging the authentication. The processes will be more fully described below with respect to FIGS. 2 and 3, and 7-8.

By way of example, the STB 103*a*-103*n* can remotely access one or more servers (e.g., the server 119), via a communication interface (not illustrated), configured to execute one or more applications in support of the controls by the wireless adhoc device 104 or the user device 106. In one embodiment, the STB instructions and commands can be executed by the user device 106 solely or in conjunction with the STB 103. Alternatively, this translation process can be performed by the STB 103; in which case, information about the call event can be transmitted to the STB 103 with little or no processing by the user device 106. The STB command application interacts with the wireless adhoc device 104 to interpret the control signals emanating from the user device 106. Under this arrangement, the STB command application may be provided in a distributed fashion using, for instance, client-server architectures, such as implemented by enterprise application service providers (ASP).

For example, the server 119 can be an "online" system capable of communicating with one or more third-party web servers (not illustrated), content repositories (e.g., the repository 109), or equivalent facilities, to provide users various avenues to locate, specify, receive, and/or share programming content that is accessible over a data network (e.g., the packet-based network 105). In alternative embodiments, the server 119 is collocated with and/or integrated into the programming service provider 111. As such, multiple users, interfaces, and instances of the media slideshow application can be simultaneously realized through the system 100.

In the example of FIG. 1, the STBs 103*a*-103*n* are located at one or more user premises (e.g., the user premise 113), and geospatially associated with one or more regions. The STBs 103*a*-103*n* may be configured to communicate with and receive signals and/or data streams from the programming service provider 111 (or other transmission facility). These signals include results of applying search or browse operations on the available programming content (e.g., video assets) and related date (e.g., programming guide data, metadata) retrieved over a data network (e.g., the service provider network 101, the packet-based network 105, and/or the telephony network 107), as well as conventional video broadcast content.

In one embodiment, a user profile repository 121 may be employed to maintain subscribers to the device event-based STB control service. The user profile repository 121 along with the content repository 109, or the server 119 may be accessed via one or more service provider networks 101 and/or packet-based networks 105. In one embodiment, the user profile repository 121 stores user settings, preferences, and configuration information for the content delivery service. A more detailed explanation of an exemplary STB is provided with respect to FIG. 5.

In an exemplary embodiment, the STBs 103*a*-103*n* can draw, receive, and/or transmit programming guide information and related content from (or to) multiple sources, thereby alleviating the burden on any single source, e.g., the programming service provider 111, to gather, supply, or otherwise meet the content demands of any user or premise. Thus, particular embodiments enable authenticated third-party television broadcast systems 123, third-party content provider systems 125, and servers (e.g., the server 119) to transmit programming content accessible over a data network to the STBs 103*a*-103*n* either apart from, or in conjunction with, the programming service provider 111. Such programming content may include content regarding traffic, news, sports, current events, breaking stories, commentary, headlines, advertisements, solicitations, financial advice, stocks, markets, events, schools, governments, blog entries, podcasts, and the like. Moreover, media content may be available from authenticated sources, including grassroots groups or individuals, non-profits, governmental organizations, public/private institutions, etc.

In various embodiments, the service provider network 101 may include one or more video and/or audio processing modules (not shown) for acquiring and transmitting programming guide information and related content feeds (including content accessible over a data network) from the programming service provider 111, the television broadcast systems 123, the third-party content provider systems 125, or the servers 119 over one or more of the networks 101, 105, 107, to particular STBs 103*a*-103*n*. Accordingly, the service provider network 101 may include facilities to support compression/decompression, coding/decoding, modulation/demodulation, optical/electrical conversion, and analog/digital conversion, as well as any other suitable signal processing and/or transmission operation. Further, the service provider network 101 can optionally support end-to-end data encryption in conjunction with programming guide creation and related content streaming services such that only authorized users are able to access personalized programming guides and experience content reference therein.

Moreover, the network 101 may include an authentication module (not shown) configured to perform authorization/authentication services and determine whether users or content sources are indeed subscribers to, or providers of, the service. An authentication schema may require a user name and password, a key access number, a unique machine identifier (e.g., media access control (MAC) address), etc., as well as a combination thereof. Once a subscriber has authenticated a presence on the system 100, the user may bypass additional authentication procedures for executing later applications (e.g., programming content streaming instances). Data packets, such as cookies, may be utilized for this purpose. Thus, once an STB or content source is authenticated, connections between the STBs 103*a*-103*n* and the content sources may be established directly or through the programming service provider 111.

In other embodiments, authentication procedures on a first device (e.g., STB 103*a*) may identify and authenticate a second device (e.g., the wireless adhoc device 104 or the user device 106) communicatively coupled to, or associated with, the first device. Further, the authentication module may grant users the right to receive programming guide information and related content from multiple system 100 sources by revoking existing sets of digital certificates associated with a particular provider, and issuing new sets of digital certificates mapped to a second provider. In this regard, an STB (e.g., STB 103*a*)

may receive new programming content or guide information from a second source, whereas the previous session may be automatically closed when the "old" or prior certificates associated with the first source are revoked. This enables users to initiate secure sessions at any given STB 103a-103n (or end wireless adhoc device 104) linked to the system 100, whether or not the STB (or end terminal) belongs to that individual user. It is additionally contemplated that multiple rights sessions may exist concurrently.

In particular embodiments, the programming service provider 111 may comprise an IPTV system configured to support the transmission of television video programs from the broadcast systems 123 as well as other content, such as content from the various third-party sources (e.g., 109, 119, 123, and 125) utilizing internet protocol (IP). That is, the IPTV system 111 may deliver programming guide information, signals and/or streams, including programming content accessible over a data network, in the form of IP packets. Further, the transmission network (e.g., the service provider network 101) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of programming guide information and related content. Delivery of video content, by way of example, may be through a multicast from the IPTV system 111 to the STBs 103a-103n. Any individual STB may tune to a particular content source by simply joining a multicast (or unicast) of the media content, utilizing an IP group membership protocol (IGMP). For instance, the IGMP v2 protocol may be employed for joining STBs to new multicast (or unicast) groups. Such a manner of content delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the programming content may be provided to various IP-enabled devices, such as those computing, telephony, and mobile apparatuses previously delineated.

While the system 100 is illustrated in FIG. 1, the exemplary components are not intended to be limiting, and indeed, additional or alternative components and/or implementations may be utilized.

Although the user equipment is described with respect to an STB 103, it is contemplated that various embodiments have applicability to any device capable of processing video, audio, and/or multimedia streams.

FIG. 2 is a flowchart of a process for a wireless adhoc device to detect a user device that controls a set top box, according to an exemplary embodiment. The process 200 of FIG. 2 is discussed from the perspective of the wireless adhoc device 104, which in this example is a personal computer (e.g., laptop) used to render user-generated content on a TV display via a set top box. Continuing with the example of FIG. 1, the wireless adhoc device 104, per step 201, detects user device 106 (e.g., mobile terminal) that is configured to control one or more set top boxes via wireless local area network 110 according to a predetermined communication protocol. Also, the wireless device 106 can be configured to initiate or render a media item. According to one embodiment, this protocol can be the User Datagram Protocol (UDP). In step 203, the wireless adhoc device 104 controls the one or more set top boxes directly or via the mobile terminal based on the detection of the user device 106. If the user device 106 is controlling one or more set top boxes, the wireless adhoc device 104 establishes a communication channel with the user device 106 using a communication protocol (e.g., TCP). TCP provides the service of exchanging data directly between two network hosts.

If there is no user device controlling the set top boxes, the wireless adhoc device 104 detects one or more STBs by broadcasting a UDP message. The wireless adhoc device 104 then establishes a communication channel with the set top boxes using a communication protocol (e.g., TCP). The wireless adhoc device 104 then uses a communication protocol to transmit STP commands and/or STB associated commands to the STBs in a communication protocol (e.g., Simple and Extensible Transmission Protocol, SETP, etc.). The SETP is optimized for the exchange of information in the context of controlling the STB thereby supporting the interaction among STBs, the wireless adhoc device and the user devices. The SETP was described in the U.S. patent application Ser. No. 12/850,419 entitled "Method and Apparatus for Controlling a Set top Box Based on Device Events" which is hereby incorporated by reference by its entirety. Details of the establishment of the communication channels is provided with respect to FIGS. 7 and 8.

By way of example, the wireless adhoc device 104 sends a command to the user device 106, to render a user-generated content items retrieve from, for instance, a website (e.g., social network website). The command instructs the STB 103a, for example, to lower or mute the volume. Alternatively, the wireless adhoc device 104 sends a command directly to the STB 103a, to render the user-generated content. The command instructs the STB 103a to lower or mute the volume. In another embodiment, the command can be produced based on a voice command from the wireless adhoc device 104. In this manner, either the wireless adhoc device 104 or the user device 106 has a voice recognition capability to translate speech from a user into, e.g., text, which can then be used to output an appropriate STB command.

Next, the wireless adhoc device 104 receives or more notifications (e.g., acknowledgement that the user-generated content items is received, etc.) from the one or more set top boxes directly or via the user device 106, as in step 205, over the established adhoc connection or channel. The mapping among the wireless adhoc device, the user device, the STB, and controlled STB functions/commands can be one-to-one, one-to-many, or many-to-many. By way of examples, the number of wireless adhoc devices "1", the number of user devices "m", and the number of STBs "n" are mapped to a particular STB function/command—e.g., a "mute" function. In this case, all of the wireless adhoc devices 104 can set a "mute" command to the STBs 103a-103n via the user devices 106. The ways for the STBs to determine a priority for executing the mute commands from different sources are later described.

Moreover, the user device 106 has a mapping functionality to map responses/notifications from the STBs 103a-103n to the corresponding one or more wireless adhoc devices, in order to route the STB commands correctly. In one embodiment, the user device 106 can be a mobile phone which can be WiFi enabled and provided with software for controlling TV functionalities. This software includes all features available in a regular IR remote. This software allows a user to type a text message and to record audio or video to be sent to all or particular user of a TV/PC. In addition, the user device 106 can authenticate and connect to the wireless adhoc device 104.

FIG. 3 is a flowchart of an authentication process for establishment of a wireless adhoc connection, according to an exemplary embodiment. The process 300 of FIG. 3 is discussed from the perspective of the set top box 103*a*. In step 301, a connection request from the wireless adhoc device 104 or the user device 106 can be detected by the STB 103*a*. It is contemplated that in general any connection request is applicable (e.g., commands as described later with respect to FIG. 4). Next, the STB 103*a* authenticates either the wireless adhoc device 104 or the user device 106 (that is controlling the STB 103*a*) to determine whether they have right to control the STB 103*a*, as in step 303. To receive a control command at the STB 103*a*, the STB 103*a* transmits a response acknowledging the authentication to the wireless adhoc device 104 or the user device 106, per step 305. For example, the control command can specify modification of the volume level to permit the user to more easily hear the user-generated media content item.

Once authorization is complete and a handshake is performed, the wireless adhoc device 104 or the user device 106 sends the message to the STB 103*a*. In one embodiment, the STB 103*a* has residing there in a piece of software responsible for receiving messages as text/audio/video from the wireless adhoc device 104 or the user device 106. This software can be also responsible for displaying messages, media item, etc. on a TV/PC screen.

This capability alleviates the need for user intervention to search out any existing remote control in order to execute an STB function, e.g., volume adjustment. Such user maneuver traditionally would require user intervention to trigger an application on the wireless adhoc device 104 so as to determine if the wireless adhoc device 104 can control the STB 103*a* directly or via the user device 106. This is particularly advantageous if there are multiple users who desire to control the STB 103*a* via their respective user devices.

Figure 4:
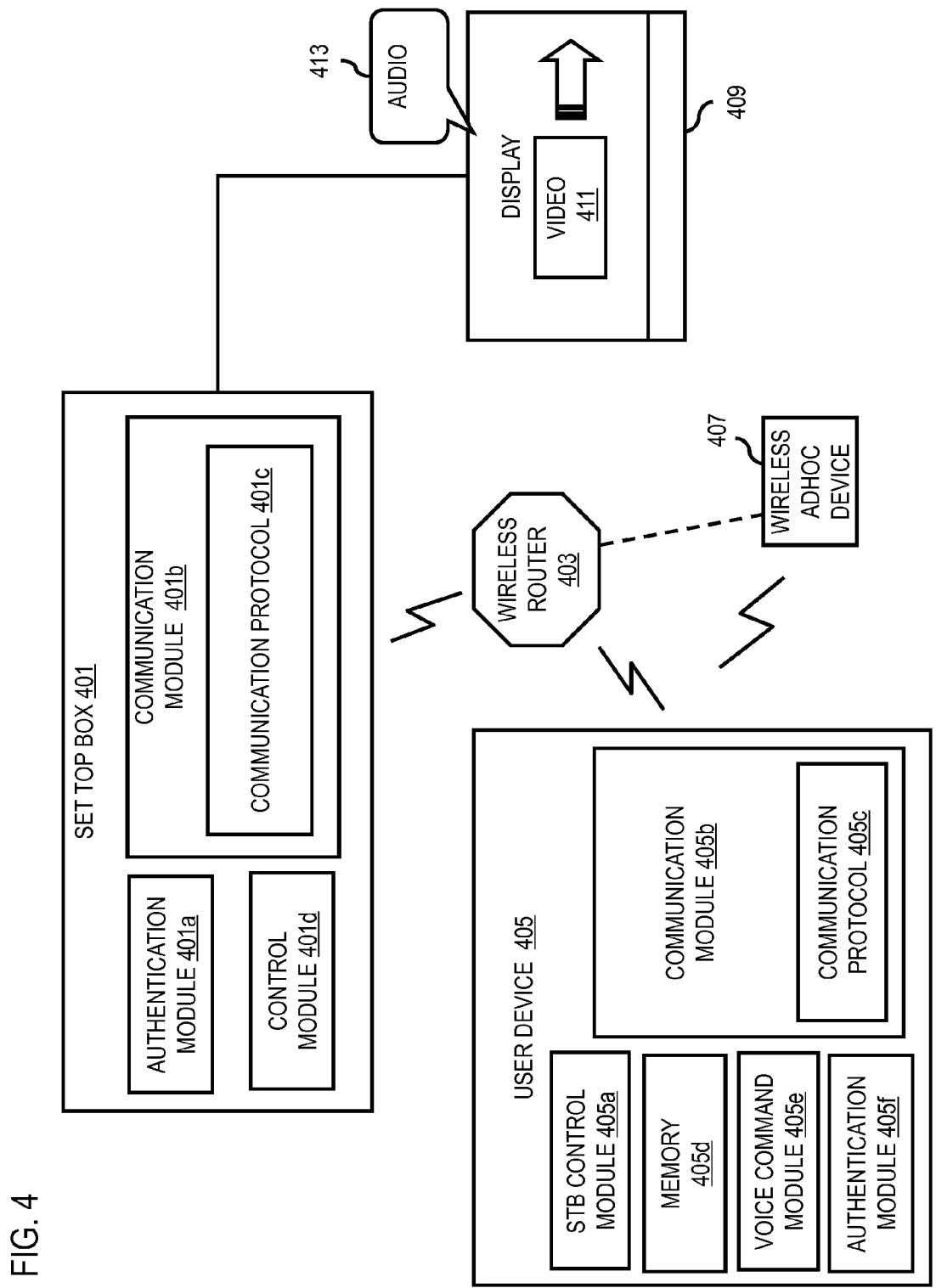
FIG. 4 is a diagram of a wireless environment utilizing a wireless adhoc device to provide control over a set top box, according to an exemplary embodiment.

FIG. 4 is a diagram of a wireless environment utilizing a wireless adhoc device to provide control over a set top box, according to an exemplary embodiment. In this example, the STB 401 operates within a wireless local area network (LAN) through the use of a wireless router 403, using Wi-Fi. The router 403 provides connectivity among the user device 405 (e.g., mobile phone with Wi-Fi capability, PDA, etc.) and a wireless adhoc device 407 (e.g., a computer device).

This arrangement enables use of a mobile phone, for example, as a remote control device for the wireless adhoc device 407 to control the set top box 401. Such an environment can support devices that are Wi-Fi enabled or wired (via e.g., an Ethernet cable) connection from the wireless adhoc device 407 to the router 403 (shown in a broken line), either directly or through another network component such as a hub.

The STB 401 includes an authentication module 401*a* configured to operate with a communication module 401*b* (executing a communication protocol 401*c*) to determines whether the devices 405, 407 are authorized to control STB 401. The authorization procedure is more fully described with respect to FIGS. 7 and 8. If yes, the communication module 401*b* will accept control signals from the user device 405 and the wireless adhoc device 407. The control signals may be related to media rendering events, such as rendering a purchased song, a digital game, etc. Thereafter, the STB 401 outputs control signals to a display 409. The communication module 401*b*, among other functions, is responsible for "listening" to incoming commands and requests. Although not shown, the wireless adhoc device 407 can also include a STB control module for generating control signals directly to the STB 401 to render media content. The communication protocol 401*c* can be an extensible protocol for communicating among the various devices. The protocol facilaites device detection, device bonding/authentication, command packets and data handling, payload transmission, etc. The purpose of bonding is to create a relation between two devices based on a common link key (a bond). The link key can be created and exchanged (pairing) during the bonding procedure and is expected to be stored by both devices, to be used for future authentication. Before bonding can be initiated, the initiating device (A) must know the Device Access Code of the device to pair with.

In one embodiment, an authentication module 401*d* receives commands from the user device 405 and authenticates whether the sending device can be authorized to control the STB 401. In another embodiment, authentication module 401*d* further determines a control priority among a plurality if user devices over STB functions and/or commands executed separately or concurrently.

In addition to the STB control module 405*a*, the user device 405 also includes a communication module 405*b* (executing a communication protocol 405*c*), and a memory 405*d* configured to store media, such as images and audio files. Furthermore, a voice command module 405*e* provides conversion (or translation) and recognition of speech (utterances) from the user for controlling the STB 401 to perform certain actions. These actions relate to various STB functions, e.g., channel control, volume control, muting, search, etc. The module 405*e* can execute, in one embodiment, a voice-to-text (or speech-to-text) application to text data, which can then be used to create an STB command.

Moreover, the user device 405 also includes an authentication module 405*f* receives commands from the wireless adhoc device 407 and authenticates whether the wireless adhoc device 407 is authorized to control the STB 401. In another embodiment, the authentication module 405*f* further determines a control priority among a plurality if user devices over STB functions and/or commands executed separately or concurrently.

To coordinate the control over the STB 401, the wireless adhoc device 407, the user device 405, and STB 401 employ communication protocol 405*c* and 401*c*, respectively, to create a communication channel for transport of data messages as well as command (or control) messages. As more fully described below, the communication protocol can utilize transport protocols, such as Transmission Control Protocol (TCP) or User Datagram Protocol (UDP) over Internet Protocol (IP). As shown, upon execution of a command stemming from a media rendering request, presentation of video 411 and audio 413 can be altered, for example, for the duration of a media content item.

Figure 5:
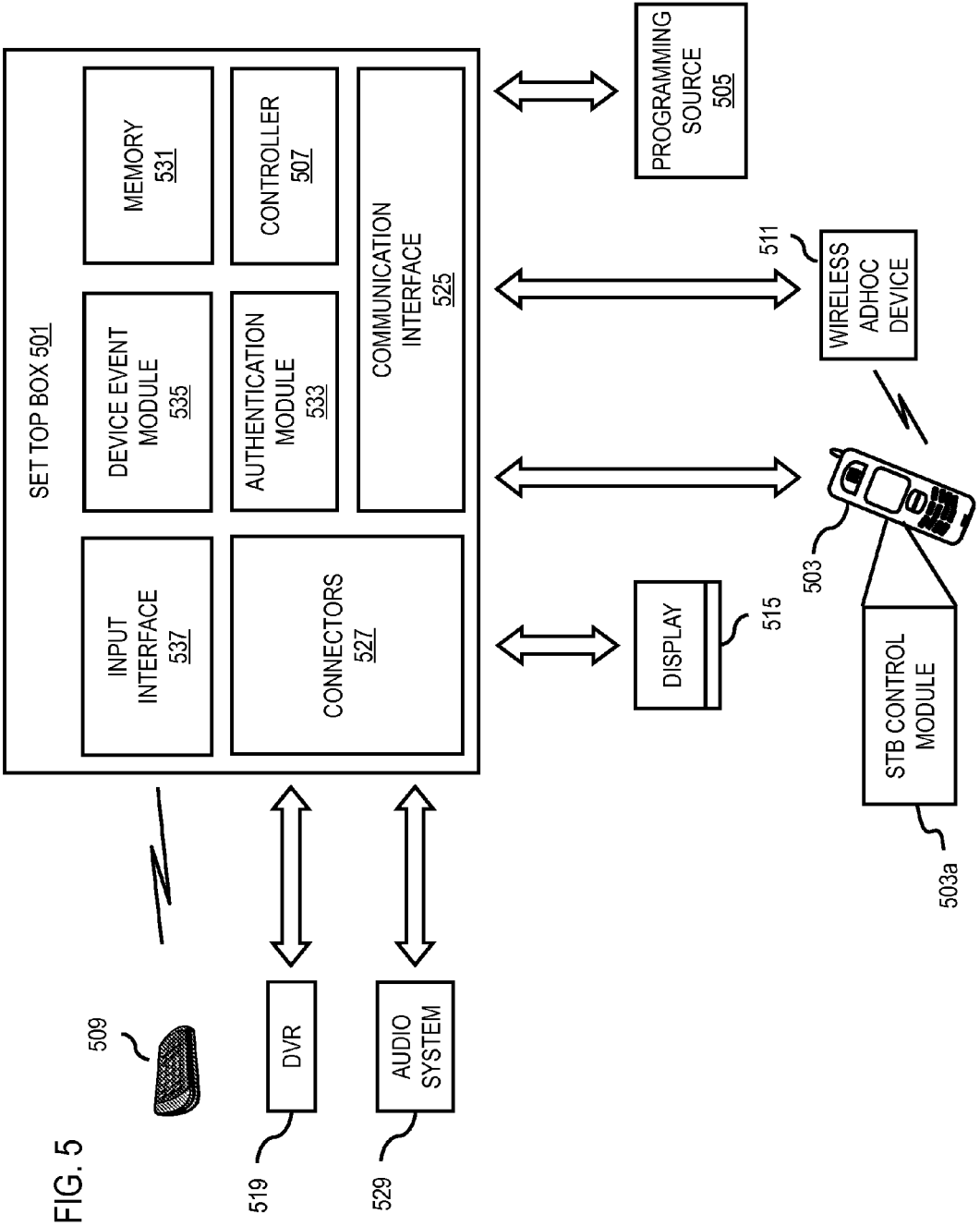
FIG. 5 is a diagram of a set top box configured to be controlled based on based upon prioritization of user devices, according to an exemplary embodiment.

FIG. 5 is a diagram of a set top box configured to be controlled based on based upon prioritization of user devices, according to an exemplary embodiment. The STB 501 can utilize any suitable technology to receive media from the user device 503 (e.g., mobile phone), as well as one or more content streams from a programming source 505, such as the IPTV system of FIG. 1. In this example, the user device 503 includes an STB control module 503*a*.

The STB 501 can comprise computing hardware (such as described with respect to FIG. 9) and include additional components configured to provide services related to processing STB commands. In addition, the STB 501 includes hardware and/or other components to support related functions and capabilities for viewing video assets (e.g., remote control capabilities, conditional access functions, tuning functions, presentation functions, multiple network interfaces, audio/video signal ports, etc.). As shown in FIG. 5, the functions and operations of the STB 501 can be governed by a controller 507 that interacts with each of the STB components to provide programming guide information and related content retrieved from an audio or video-sharing site, as well as from another STB device or component of the system 100. In turn, the user can be afforded greater functionality utilizing a control device 509 to control the personalized programming guide service and related services, as will be more fully described below. As later explained, remote control functions can also be provided via the user device 503.

The STB 501 can be configured to communicate with a number of user devices, including: a wireless adhoc device 511 (e.g., a PC), laptops, PDAs, the user device 503 (e.g., a cellular phone), mobile devices, handheld devices, as well as any other equivalent technology capable of capturing and storing media. According to another embodiment, the wireless adhoc device 511, as a user device, can also be configured with a STB control module to transfer media items to the STB 501 for presentation to the display 515.

As such, the STB 501 can be configured to provide an indicator that the STB 501 is being controlled by the user device 503 on (or at) the display 515. In one embodiment, presentation of the media (or content) can include: displaying, recording, playing, rewinding, forwarding, toggling, selecting, zooming, or any other processing technique that enables users to manipulate the media item. For instance, the STB 501 can provide one or more signals to the display 515 (e.g., television) so that the display 515 can present the media, as images, audio, video, or any combination thereof. A communication interface (not illustrated) of the wireless adhoc device 511 can be configured to retrieve the programming and content information over the data network (e.g., packet-based network 105), wherein the STB 501 can receive a programming content stream directly from the wireless adhoc device 511 to present to the user via the display 515.

The STB 501 can also interact with a PVR, such as digital video recorder (DVR) 519, to store received content that can then be manipulated by a user at a later point in time. In various embodiments, the DVR 519 can be network-based, e.g., included as a part of the service provider network 101, collocated at a subscriber site having connectivity to the STB 501, and/or integrated into the STB 501.

Furthermore, the STB 501 can include a communication interface 525 configured to receive content streams from the programming service provider 111, the wireless adhoc device 511, a server (not shown), or other programming content source 505, such as media source. The communication interface 525 can optionally include single or multiple port interfaces. For example, the STB 501 can establish a broadband connection to multiple sources transmitting content to the STB 501 via a single port, whereas in alternative embodiments, multiple ports can be assigned to the one or more sources. In still other embodiments, the communication interface 525 can be configured to permit users, via the STB 501, to transmit data (including media content) to other users with STBs, a programming service provider 111, or other content source/sink.

According to various embodiments, the STB 501 can also include inputs/outputs (e.g., connectors 527) to the display 515 and the DVR 519, as well as an audio system 529. In particular, the audio system 529 can include a conventional audio-video receiver capable of monaural or stereo sound, as well as multichannel surround sound. The audio system 529 may include speakers, ear buds, headphones, or any other suitable component configured for personal or public dis-semination. As such, the STB 501, the display 515, the DVR 519, and the audio system 529, for example, can support high resolution audio and/or video streams, such as high definition television (HDTV) or digital theater systems high definition (DTS-HD) audio. Thus, the STB 501 can be configured to encapsulate data into a proper format with required credentials before transmitting onto one or more of the networks of FIG. 1 and de-encapsulate incoming traffic to dispatch data to the display 515 and/or the audio system 529.

In an exemplary embodiment, the display 515 and/or the audio system 529 can be configured with internet protocol (IP) capability (i.e., includes an IP stack, or is otherwise network addressable), such that the functions of the STB 501 can be assumed by the display 515 and/or the audio system 529. In this manner, an IP ready, HDTV display or DTS-HD audio system can be directly connected to one or more service provider networks 101, packet-based networks 105, and/or telephony networks 107. Although the STB 501, the display 515, the DVR 519, and the audio system 529 are shown separately, it is contemplated that these components can be integrated into a single component, or other combination of components.

An authentication module 533 can be provided at the STB 501 to initiate or respond to authentication schemes of, for instance, the user device 503, the wireless adhoc device 511, the service provider network 101 or various other content providers, e.g., the broadcast television systems 123, the third-party content provider systems 125, or the servers 119. The authentication module 533 can provide sufficient authentication information, e.g., a user/entity name and password, a key access number, a unique machine identifier (e.g., MAC address), and the like, as well as combinations thereof, to a corresponding network interface for establishing connectivity. As described earlier, one or more digital certificates can be simultaneously mapped. The authentication at the STB 501 can identify and authenticate a second device (e.g., the wireless adhoc device 511) communicatively coupled to, or associated with, the STB 501, or vice versa, via the user device 503. Further, authentication information can be stored locally at the memory 531, in a repository (not shown) connected to the STB 501, or at a remote repository, e.g., the user profile repository 121.

In another embodiment, the authentication module 533 further determines the control priority among a plurality of wireless adhoc devices and user devices based upon a look-up table stored internally or retrieved externally. By way of example, parents' devices are set with higher control priority than children's devices in the household. In one embodiment, a patent can control a child's device to adjust the media rending on a home theater display, while the child's device cannot control via the parent device to adjust the media rending on the home theater display. In another embodiment, the STB 501 handles a patent's connection request and/or STB command with priority over a connection request and or STB commands from a child's device, to adjust the media rending on a home theater display.

The priority settings can be defined per functions and/or per command, such as media content selection, media content rendering resolution/volume/timing/etc., media content recording resolution/volume/timing/etc., etc. By way of example, when displaying a political, military or business entity action, the priority settings are programmed to be adjusted based upon the relevant rankings of the participants. In another example, when playing a game on the home theater display, the priority settings are programmed to be real-time adjusted based upon the gaming scores of the participants.

The authentication module 533 can also facilitate the reception of data from single or disparate sources. For instance, the STB 501 can receive broadcast video from a first source (e.g., the IPTV system 111), signals from a second source (e.g., the server 119), and a programming content stream from a third source accessible over a data network (e.g., the content repository 109). As such, the display 515 can present the broadcast video and programming content stream to the user. In another embodiment, this presentation can be controlled by multiple user devices separately, concurrently, in a toggled fashion, or with zooming, maximizing, minimizing, or trick capabilities, or equivalent mode, for example, based upon the above-discussed priority scheme.

The connector(s) 527 can provide various physical interfaces to the display 515, the audio system 529, as well as other peripherals. The physical interfaces can include, for example, RJ45, RJ11, high definition multimedia interface (HDMI), optical, coax, FireWire, wireless, and universal serial bus (USB), or any other suitable connector. The presentation module 535 can also interact with another control device 509 for determining particular media content that a user desires to experience. In an exemplary embodiment, the control device 509 can comprise a remote control (or other access device having control capability, such as the wireless adhoc device 511, wireless device, mobile phone, etc.) that provides a user with the ability to readily manipulate and dynamically change parameters affecting the device event-based STB control service. In other examples, the STB 501 can be configured for voice recognition such that STB 501 can be controlled with spoken utterances.

In addition to the user device 503 and the wireless adhoc device 511, the STB 501 can also permit the control device 509 to activate and deactivate the STB control service. In this manner, the control device 509 can include (not shown) a cursor controller, trackball, touch screen, touch pad, keyboard, and/or a key pad for activating a slideshow application, selecting programming content, as well as performing other control functions. The control device 509 can also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, the control device 509 can comprise a memory (not illustrated) for storing preferences relating the device event-based STB control service; such preferences can be conveyed to STB 501 through an input interface 537. The input interface 537 can support any type of wired and/or wireless link, e.g., infrared, radio frequency (RF), BLUETOOTH™, WiFi (e.g., IEEE 802.11a, 802.11b, 802.11g, 802.11n, etc.), and the like. Thus, control device 509 can store user preferences with respect to the parameters associated with the device event-based STB control service. Alternatively, user preferences can be tracked, recorded, or stored in the STB 501 or in the network user profile repository 121. The preferences can be automatically retrieved and activated by a user at any time. It is noted that the control device 509 can be separate from the STB 501 or can be integrated within the STB 501 (in which case certain input interface hardware and/or software may not be necessary).

Particular embodiments enable users, via the control device 509, to populate or otherwise configure a user profile. For instance, a user profile application may be provided or accessed by the STB 501 to enable the wireless adhoc device 511 and/or the user device 503 to populate a plurality of entry fields with user information. A user profile may include one or more customized or personalized settings relating to the wireless adhoc connection establishment.

Thus, under the above arrangements of FIG. 5, the STB 519 can authenticate the wireless adhoc device 511 and/or the user device 503 to conveniently coordinate STB functions/commands from a plurality of user devices 503, 509, 511 to permit separately and/or currently control of different functions and/or settings of the display 515 via the STB 519 when rendering a media item.

Figure 6A:
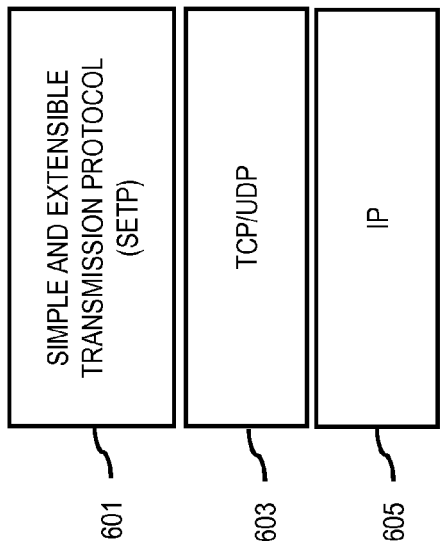
FIGS. 6A and 6B are diagrams of a communication protocol and associated messaging formats for controlling STB functions, according to various embodiments.
Figure 6B:
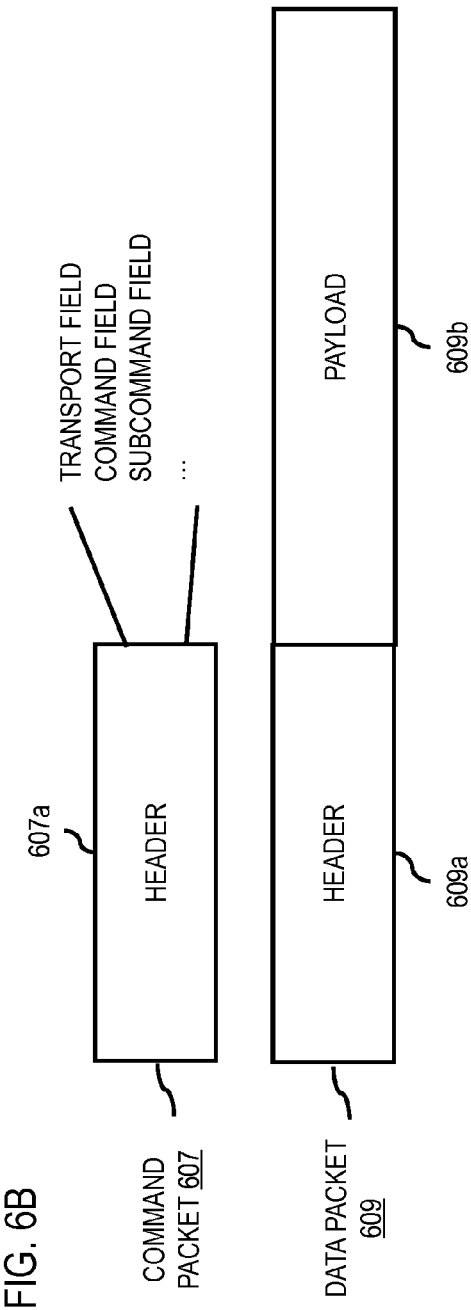

FIGS. 6A and 6B are diagrams of a communication protocol and associated messaging formats for controlling STB functions, according to various embodiments. As shown in FIG. 6A, in certain embodiments, a Simple and Extensible Transmission Protocol (SETP) 601 rests above a Transmission Control Protocol (TCP) or User Datagram Protocol (UDP) layer 603. Also, the Internet Protocol (IP) 605 can be utilized. These protocols 601-605 can configured to operate in a variety of wireless transport environments. For the purposes of illustration, the SETP 601 is explained with respect to a Wi-Fi environment.

By way of example, the SETP 601 can be a binary protocol that resides within the application layer (of the Open System Interconnect (OSI) model). According to one embodiment, this protocol is a Simple and Extensible Transmission Protocol (SETP). In general, this protocol can be used to enable communication between two devices. The communication can involve in sending commands, data and events. The SETP 601 provides device detection and bonding as well as handling of command messages and data messages. Advantageously, the protocol is designed to be simple, as to accommodate the constraints associated with portable (or mobile) devices; such devices are typically constrained by battery life and processing power.

The SETP 601 can be used to send various commands and command related information along with command data. The SETP 601 utilizes predefined command headers, thereby advantageously requiring less processing time. Also, this protocol can be efficient as the commands are pre defined and the decoding can be simple. Further, the SETP 601 can be fast, in that the processing of the commands follow different logical branches for different commands.

As mentioned, the SETP 601 can be configured to support different transport mechanisms. For instance, the addition of new transport mechanisms and associated commands can be readily accommodated. The commands and data to be transferred are secure in that SETP 601 is session based. Accordingly, passwords are never "sent out through wire"; consequently, the password need not be changed frequently.

The SETP 601 can be used to build different applications. Although the SETP 601 is primarily described herein for the communication between STBs and user devices, the SETP 601 can also be used to communicate between any other applications/user devices to transfer STB commands and data.

As depicted in FIG. 6B, a command message (or referred to as command packet in the case of IP) 607 includes only a header. A data message (data packet) includes a header 609a and a payload 609b.

The SETP header structure 609a can be used to carry all the commands, data and events. By way of example, the header include a Protocol Identifier (ID) field, a Protocol Version field, a Protocol Subversion field, a Command field identifies the command carried by the protocol, a Command Sequence field denotes the sequence number of the packet sent, a Time Stamp field, a From Info field, a Payload Length field, etc. There need not be any constraint on format or the manner in which the payload can be manipulated and handled. The payload data can be specified in the name, length and value pair, for example. In this manner, the SETP 601 can accommodate different proprietary headers and different objects at the same time.

By way of example, the STB commands that are supported by SETP 601 fall into two categories: (1) authenticated commands, and (2) unauthenticated commands. The authenticated commands are the commands can be used only after the authentication, while the unauthenticated commands can be used in both authenticated and unauthenticated sessions.

By way of example, a Remote Control Command can be an authenticated command provided for sending the remote control keys to the receiving side (e.g., the STB). A response to this type of command is not needed. Table 1 shows the sub commands:

TABLE 1

```
RC_KEY_POWER = 0
RC_KEY_MUTE = 1
RC_DEVICEKEY_STB = 2
RC_DEVICEKEY_AUX = 3
RC_DEVICEKEY_DVD = 4
RC_DEVICEKEY_TV = 5
RC_KEY_MENU = 6
RC_KEY_GUIDE = 7
RC_KEY_INFO = 8
RC_CONTROL_UP = 9
RC_CONTROL_DOWN = 10
RC_CONTROL_LEFT = 11
RC_CONTROL_RIGHT = 12
RC_CONTROL_OK = 13
RC_KEY_EXIT = 14
RC_KEY_OPTIONS = 15
RC_KEY_WIDGETS = 16
RC_KEY_ONDEMAND = 16
RC_KEY_FAVOURITES = 17
RC_KEY_JUMP = 18
RC_KEY_FIOSTV = 19
RC_KEY_CHANNELUP = 20
RC_KEY_CHANNELDOWN = 21
RC_KEY_VOLUMEUP = 22
RC_KEY_VOLUMEDOWN = 23
RC_KEY_SKIPBACK = 24
RC_KEY_SKIPFORWARD = 25
RC_KEY_DVR = 26
RC_KEY_PLAY = 27
RC_KEY_STOP = 28
RC_KEY_PAUSE = 29
RC_KEY_FORWARD = 30
RC_KEY_BACKWARD = 31
RC_KEY_REC = 32
RC_KEY_1 = 33
RC_KEY_2 = 34
RC_KEY_3 = 35
RC_KEY_4 = 36
RC_KEY_5 = 37
RC_KEY_6 = 38
RC_KEY_7 = 39
RC_KEY_8 = 40
RC_KEY_9 = 41
RC_KEY_0 = 42
RC_KEY_ASTERISK = 43
RC_KEY_HASH = 44
RC_CONTROLKEY_A = 45
RC_CONTROLKEY_B = 46
RC_CONTROLKEY_C = 47
RC_CONTROLKEY_D = 48
RC_KEY_INPUT = 49
RC_KEY_PIP = 50
RC_KEY_PIPCHANGE = 51
```

Figure 7:
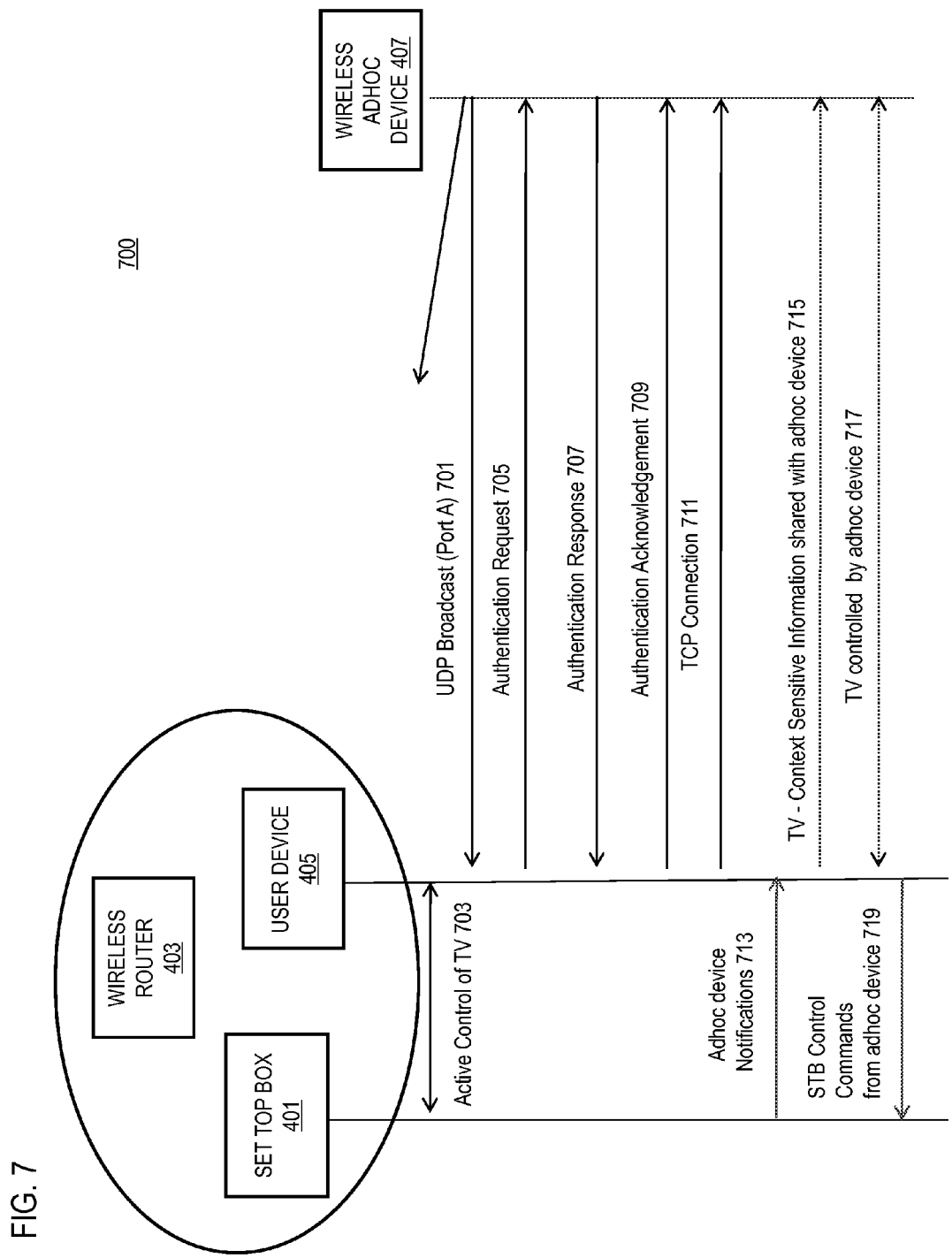
FIG. 7 is a ladder diagram of a process for establishing communication between a wireless adhoc device and a set top box via a user device, according to an exemplary embodiment.

FIG. 7 is a ladder diagram of a process 700 for establishing a wireless adhoc connection between a wireless adhoc device and a set top box via a user device, according to an exemplary embodiment. By way of example, the process associated with the SETP 601 is explained with respect to the system of FIG. 4, wherein a wireless adhoc connection can be established between the wireless adhoc device 407 and the set top box 401 via the user device 405.

In this example, the user device 405 and the wireless adhoc device 407 are each assigned with a User ID and password (or passcode). The assignment of these credentials can be managed by a service provider according to one embodiment. In one embodiment, the devices 405, 407 communicate with each other when both credentials are the same as they are owned and/or controlled by the same user. In another embodiment, the user device 405 and the wireless adhoc device 407 are owned/controlled by different users. According to certain embodiments, a key can be generated from the User ID and password (e.g., a personal identification number, PIN) to be sent as part of broadcast packets. Under this arrangement, there is flexibility for interested devices to establish a communication channel with the broadcasting device.

As shown, the wireless adhoc device 407 is a "broadcasting device," while the user device 405 is a "broadcasting receiver device." For instance, in a process 701, the wireless adhoc device 407 initiates a user datagram protocol (UDP) broadcast within the wireless local area network to perform the detection of the user device 405 (controlling the set top box 401). The SETP 601, in certain embodiments, provides for binding and listening on predetermined port for both the TCP and UDP packets. The user device that does not want to be detected need not start a UDP server. Similarly in the case in which a user device does not want to support the detection mechanism (and only wants to be an originator all the time), such device also need not start the TCP server. If a device wants to support the detection mechanism (and only wants to be the terminator), the particular device need not start the TCP server, but needs to start the UDP server.

When the wireless adhoc device 407 does not detect any the broadcast receiver device 405 having active control over the STB 401, the wireless adhoc device 407 starts detecting available STBs in a predetermined range (e.g., reachable via WiFi). This scenario will be discussed in conjunction with FIG. 8.

When the user device 405 is detected as having active control over the STB 401 during a process 703, the user device 405 communicates with the wireless adhoc device 407 to authenticate the wireless adhoc device 407 thereby establishing a communication channel (e.g., TCP session or channel) with the wireless adhoc device 407.

Thereafter, the user device 405 sends an authentication request to the wireless adhoc device 407 to authenticate the wireless adhoc device 407 in a process 705. By way of example, the SETP 601 ensures session security and data security using the SHA family of algorithms (SHA-1) for the encryption. An initial "SETP BROADCAST" packet can be sent by the user device 405. The BROADCAST packet carries a SHA-1 key and a nonce value as its payload. The SHA-1 key can be generated using the combination of the User ID, password and the nonce value (time stamp generated during the packet generation). For example, if the User ID can be "51234567890", the password can be "ABCD" and the time stamp can be "987654321", the combined string "51234567890ABCD987654321" can be formed. The resultant string can be used as an input to generate the SHA-1 key.

The wireless adhoc device 407 receives this BROADCAST packet and extracts the SHA key and the nonce value. Since the wireless adhoc device 407 also is aware of the User ID and password, the wireless adhoc device 407 generates the SHA key using the nonce value (extracted from the BROADCAST packet) sent by the user device 405. The wireless adhoc device 407 sends back an authentication response to the user device 405 in a process 707.

The user device 405 checks internally or externally to ensure the wireless adhoc device 407 can be authorized to control the STB 401, and then sends an authentication acknowledgment to the wireless adhoc device 407 in a process 709. By way of example, when the resultant SHA key generated by the terminator can be the same as the one received from the user device 405, a TCP communication channel can be established with the user device 405 in a process 711.

In particular, after the wireless adhoc device 407 accepts the TCP connection, its challenges the user device 405 with the SETP INIT REQUEST. This request, for example, includes a nonce value as a payload. Once the user device 405 receives this INIT REQUEST, device 405 generates the SHA key using the User ID, password and the nonce value (received from the wireless adhoc device 407). The user device 405 challenges the wireless adhoc device 407 with a nonce value and with the SHA key through the SETP INIT RESPONSE.

When the wireless adhoc device 407 receives this INIT RESPONSE, the wireless adhoc device 407 extracts the nonce value and the SHA from the INIT RESPONSE. The wireless adhoc device 407 then responds to the challenge by generating the SHA key and sends the key through the SETP INIT ACK.

After both the wireless adhoc device 407 and the user device 405 successfully responded to the challenges, they are paired and can communicate. According to one embodiment, to ensure the communication channel is secure, the wireless adhoc device 407 or the user device 405 can periodically challenge the other entity through a SETP AUTH REQUEST and appropriate SET AUTH RESPONSE. If any of the entity fails to respond the challenges successfully, the communication channel will be closed.

According to certain embodiments, all the further communications between the wireless adhoc device 407 and the user device 405 will be conducted over this TCP channel in the case of TCP transport. If the TCP connection is broken, the described authentication procedure is performed again for the new communication channel. That is, on successful handshake, both the originator and terminator devices can maintain the TCP channel for the whole session. This TCP channel can be closed and opened at any point of time during the communication. Each re-opening of communication channel requires the described handshaking mechanism to be performed for the authentication. The command and data packets (which were described above) can be sent through this established channel. The connection will be closed if the authentication or authorization fails. Also, an established communication channel can be closed by sending a session close command; however, closing the TCP channel can also terminate this session.

If the wireless adhoc device 407 is not authenticated, using an initial hand shaking within a predetermined period (e.g., 120 seconds) of the connection being opened, the connection is closed. If the connection is accepted by the user device 405, this procedure is completed, the TCP session is secured.

Thereafter, the STB 401 sends notifications to the user device 405 in a process 713. In one embodiment, the user device 405 forwards the notifications "as are" to the wireless adhoc device 407. In another embodiment, the user devices 405 converts or translates the notifications and then shares TV-content sensitive information with the wireless adhoc device 407 in a process 715. Based at least in part on the TV-content sensitive information, the wireless adhoc device 407 sends control signals to the STB 401 in a process 717 by sending commands to the user device 405, which then transfers the commands to the STB 401. In other words, the commands can be directly forwarded to the STB 401. Alternatively, the user device 405 translates the commands into STB commands and then transmits the STB commands to the STB 401 in a process 719.

Figure 8:
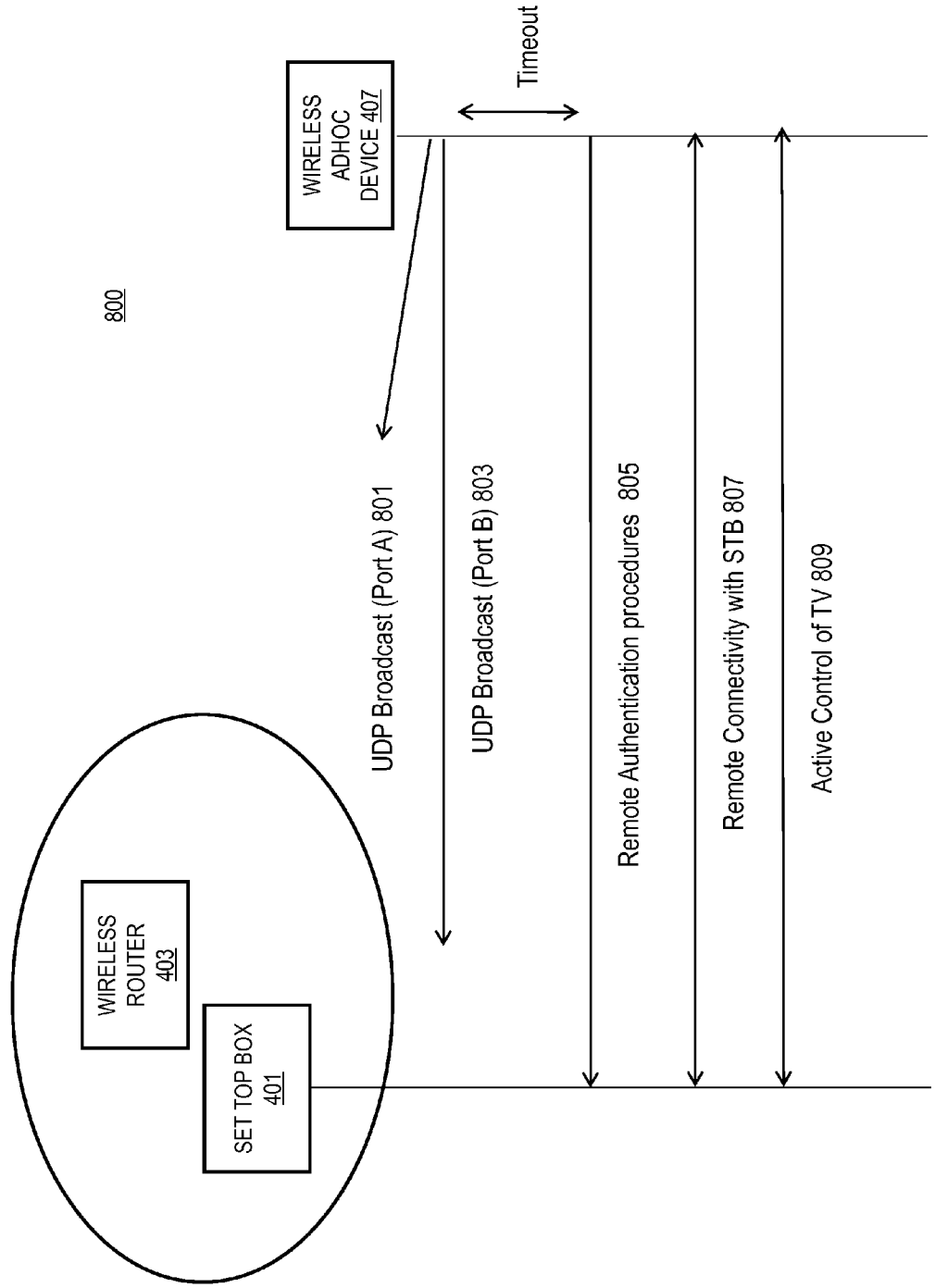
FIG. 8 is a ladder diagram of a process for establishing communication between a wireless adhoc device and a set top box, according to an exemplary embodiment.

FIG. 8 is a ladder diagram of a process 800 for establishing communication between a wireless adhoc device and a set top box, according to an exemplary embodiment. By way of example, the process associated with the SETP 601 is explained with respect to the system of FIG. 4, wherein communication is established between the wireless adhoc device 407 and the set top box 401 without going through the user device 405.

In a process 801, the wireless adhoc device 407 initiates (via e.g., a port A thereof) a user datagram protocol (UDP) broadcast within the wireless local area network to detect whether there is any user device 405 that is controlling the STB 401. When the wireless adhoc device 407 does not detect any user device 405 having active control over the STB 401 after a period of time (i.e., timeout), the wireless adhoc device 407 initiates a user datagram protocol (UDP) broadcast (via e.g., a port B thereof) to find STBs in a predetermined range (e.g., reachable via WiFi) in the wireless local area network, in a process 803.

A typical wireless router adopts 802.11b or 802.11g with a stock antenna may have a range of 32 m (120 ft) indoors and 95 m (300 ft) outdoors. Using IEEE 802.11n can double the range and beyond. WiFi range also varies with the frequency band. Through the use of directional antennas, WiFi outdoor ranges can be improved with antennas located several kilometers or more from their base. Due to reach requirements for wireless LAN applications, WiFi has fairly high power consumption compared to short range wireless communication technologies such as Bluetooth provides a much shorter propagation range (<10 m) and a lower power consumption.

When the wireless adhoc device 407 detects the STB 401, the STB 401 initiates a process 805 to authenticate the wireless adhoc device 407 thereby establishing a communication channel (for example, in TCP) with the wireless adhoc device 407 in the wireless local area network, in a process 807, similar to the processes 705-711 of FIG. 7. Thereafter, the wireless adhoc device 407 exercises active control over the STB 401 in a process 809, similar to the processes 713-717 of FIG. 7.

The STB 401 can listen on the same port A or B for both the TCP and UDP packets. When an originating device wants to detect other SETP responders, such device generates the UDP broadcasting packets. Upon detection of this broadcast message, the STB 401 initiates establishment of a TCP connection (per step 807), using the above-discussed handshaking procedure of FIG. 7. Hence, by receiving this broadcasting packet, the STB 401 can establish a TCP communication channel with the wireless adhoc device 407.

The described processes and arrangement advantageously enables automatic control of set top boxes over wireless adhoc connections in response to commands from a wireless adhoc device or a user device, e.g., mobile phone. In certain embodiments, the communication between the wireless adhoc device, the user device, and the STB is facilitated by a simple and extensible transmission protocol.

Figure 9:
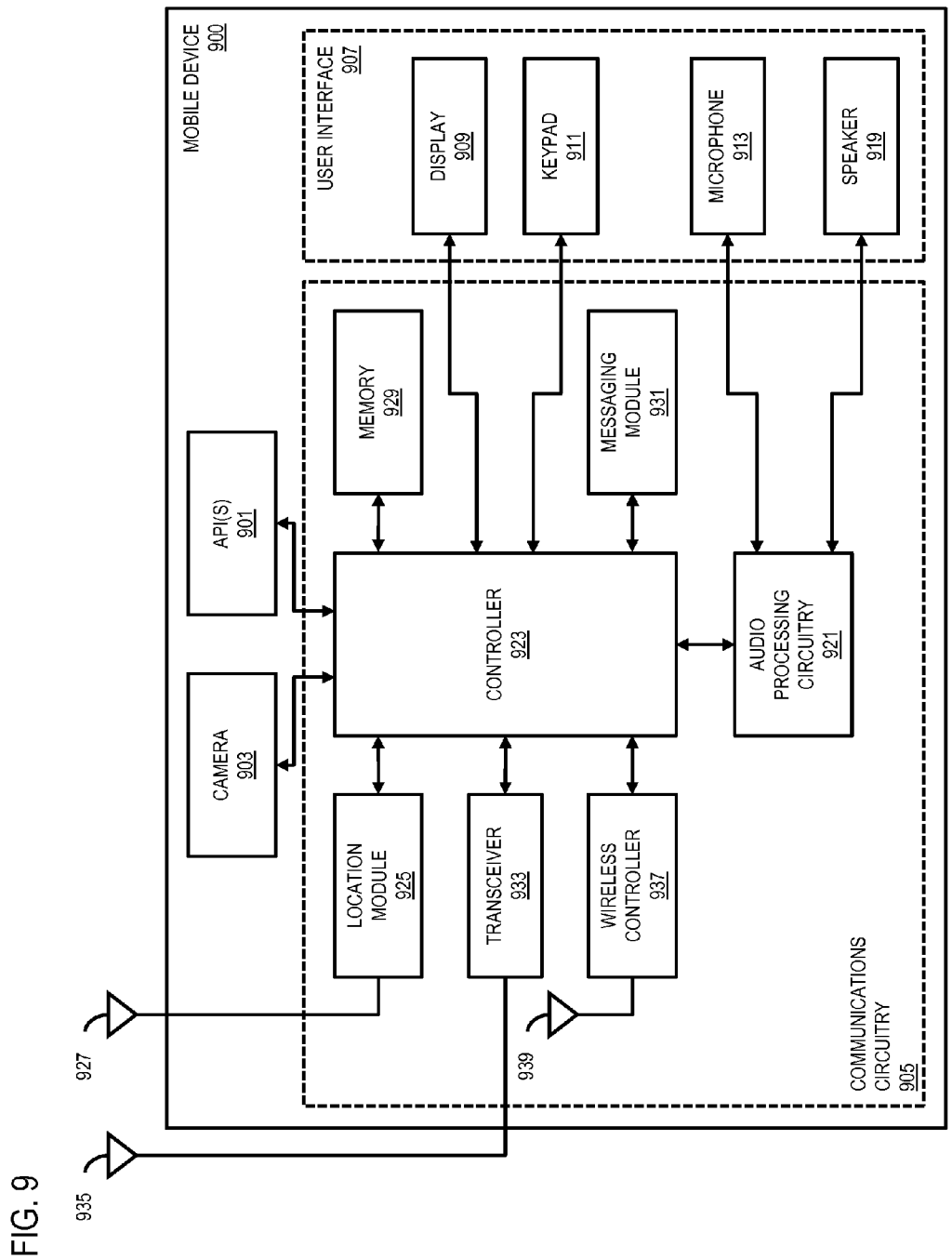
FIG. 9 is a diagram of a mobile device configured to remotely control a STB, according to an exemplary embodiment.

FIG. 9 is a diagram of a mobile device configured to remotely control a STB, according to an exemplary embodiment. Mobile device 900 may comprise computing hardware (such as described with respect to FIG. 10), as well as include one or more components configured to execute the processes described herein for providing control of a set top box (STB) over a wireless adhoc connection from or through the mobile device 900. In this example, mobile device 900 includes application programming interface(s) 901, camera 903, communications circuitry 905, and user interface 907. While specific reference will be made hereto, it is contemplated that mobile device 900 may embody many forms and include multiple and/or alternative components.

According to exemplary embodiments, user interface 905 may include one or more displays 909, keypads 911, microphones 913, and/or speakers 915. Display 909 provides a graphical user interface (GUI) that permits a user of mobile device 900 to view dialed digits, call status, menu options, and other service information. The GUI may include icons and menus, as well as other text and symbols. Keypad 909 includes an alphanumeric keypad and may represent other input controls, such as one or more button controls, dials, joysticks, touch panels, etc. The user thus can construct user profiles, enter commands, initialize applications, input remote addresses, select options from menu systems, and the like. Microphone 911 coverts spoken utterances of a user (or other auditory sounds, e.g., environmental sounds) into electronic audio signals, whereas speaker 913 converts audio signals into audible sounds.

Communications circuitry 905 may include audio processing circuitry 921, controller 923, location module 925 (such as a GPS receiver) coupled to antenna 927, memory 929, messaging module 931, transceiver 933 coupled to antenna 935, and wireless controller 937 coupled to antenna 939. Memory 929 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 929 may be implemented as one or more discrete devices, stacked devices, or integrated with controller 923. Memory 929 may store information, such as one or more user profiles, one or more user defined policies, one or more contact lists, personal information, sensitive information, work related information, etc.

Additionally, it is contemplated that mobile device 900 may also include one or more applications and, thereby, may store (via memory 929) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, control signals received by mobile device 900 from, for example, platform 103 may be utilized by API(s) 901 and/or controller 923 to facilitate remotely configuring, modifying, and/or utilizing one or more features, options, settings, etc., of these applications. It is also contemplated that these (or other) control signals may be utilized by controller 923 to facilitate remotely backing up and/or erasing data associated with these applications. In other instances, the control signals may cause mobile device 900 to become completely or partially deactivated or otherwise inoperable.

Accordingly, controller 923 controls the operation of mobile station 900, such as in response to commands received from API(s) 901 and/or data stored to memory 929. Control functions may be implemented in a single controller or via multiple controllers. Suitable controllers 923 may include, for example, both general purpose and special purpose controllers and digital signal processors. Controller 923 may interface with audio processing circuitry 921, which provides basic analog output signals to speaker 919 and receives analog audio inputs from microphone 913. In exemplary embodiments, controller 923 may be controlled by API(s) 901 in order to capture signals from camera 903 or microphone 913 in response to control signals received from platform 103. In other instances, controller 923 may be controlled by API(s) 901 to cause location module 925 to determine spatial positioning information corresponding to a location of mobile device 900. Still further, controller 923 may be controlled by API(s) 901 to image (e.g., backup) and/or erase memory 929, to configure (or reconfigure) functions of mobile device 900, to track and generate device usage logs, or to terminate services available to mobile device 900. It is noted that captured signals, device usage logs, memory images, spatial positioning information, and the like, may be transmitted to platform 103 via transceiver 933 and/or wireless controller 937. In this manner, the captured signals and/or other forms of information may be presented to users and stored to one or more networked storage locations, such as user profiles repository 117, tracking content repository 123, or any other suitable storage location or memory of (or accessible to) the components and facilities of system 100.

It is noted that real time spatial positioning information may be obtained or determined via location module 925 using, for instance, satellite positioning system technology, such as GPS technology. In this way, location module 925 can behave as (or substantially similar to) a GPS receiver. Thus, mobile device 900 employs location module 925 to communicate with constellation of satellites. These satellites transmit very low power interference and jamming resistant signals received by GPS receivers 925 via, for example, antennas 927. At any point on Earth, GPS receiver 925 can receive signals from multiple satellites, such as six to eleven. Specifically, GPS receiver 925 may determine three-dimensional geolocation (or spatial positioning information) from signals obtained from at least four satellites. Measurements from strategically positioned satellite tracking and monitoring stations are incorporated into orbital models for each satellite to compute precise orbital or clock data. Accordingly, GPS signals may be transmitted over two spread spectrum microwave carrier signals that can be shared by GPS satellites. Thus, if mobile device 900 is able to identify signals from at least four satellites, receivers 925 may decode the ephemeris and clock data, determine the pseudo range for each satellite 125 and, thereby, compute the spatial positioning of a receiving antenna 927. With GPS technology, mobile device 900 can determine its spatial position with great accuracy and convenience. It is contemplated, however, that location module 925 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multi-path analysis, and the like.

Mobile device 900 also includes messaging module 931 that is configured to receive, transmit, and/or process messages (e.g., EMS messages, SMS messages, MMS messages, IM messages, electronic mail messages, and/or any other suitable message) received from (or transmitted to) platform 103 or any other suitable component or facility of system 100. As previously mentioned, platform 103 may transmit control singles to mobile device 900 in the form of one or more API 901 directed messages, e.g., one or more BREW directed SMS messages. As such, messaging module 931 may be configured to identify such messages, as well as activate API(s) 901, in response thereto. Furthermore, messaging module 931 may be further configured to parse control signals from these messages and, thereby, port parsed control signals to corresponding components of mobile device 900, such as API(s) 901, controller 923, location module 925, memory 929, transceiver 933, wireless controller 937, etc., for implementation.

According to exemplary embodiments, API(s) 901 (once activated) is configured to effectuate the implementation of the control signals received from platform 103, e.g., from remote application 121. It is noted that the control signals are utilized by API(s) 901 to, for instance, remotely control, configure, monitor, track, and/or capture signals from (or related to) camera 103, communications circuitry 905, and/or user interface 907. In this manner, visual and/or acoustic indicia pertaining to an environment surrounding mobile device 900 may captured by API(s) 901 controlling camera 903 and microphone 913. Other control signals to cause mobile device 900 to determine spatial positioning information, to image and/or erase memory 929, to configure (or reconfigure) functions, to track and generate device usage logs, or to terminate services, may also be carried out via API(s) 901. As such, one or more signals captured from camera 903 or microphone 913, or device usage logs, memory images, spatial positioning information, etc., may be transmitted to platform 103 via transceiver 933 and/or wireless controller 937, in response to corresponding control signals provided to transceiver 933 and/or wireless controller 937 by API(s) 901. Thus, captured signals and/or one or more other forms of information provided to platform 103 may be presented to users and/or stored to one or more of user profiles repository 117 and tracking content repository 123, or any other suitable storage location or memory of (or accessible to) the components and facilities of system 100.

It is also noted that mobile device 900 can be equipped with wireless controller 937 to communicate with a wireless headset (not shown) or other wireless network. The headset can employ any number of standard radio technologies to communicate with wireless controller 937; for example, the headset can be BLUETOOTH enabled. It is contemplated that other equivalent short range radio technology and protocols can be utilized. While mobile device 900 has been described in accordance with the depicted embodiment of FIG. 7, it is contemplated that mobile device 900 may embody many forms and include multiple and/or alternative components.

The described processes and arrangement advantageously enables control of a set top box (STB) over a wireless adhoc connection. The processes described herein for providing set top box control may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
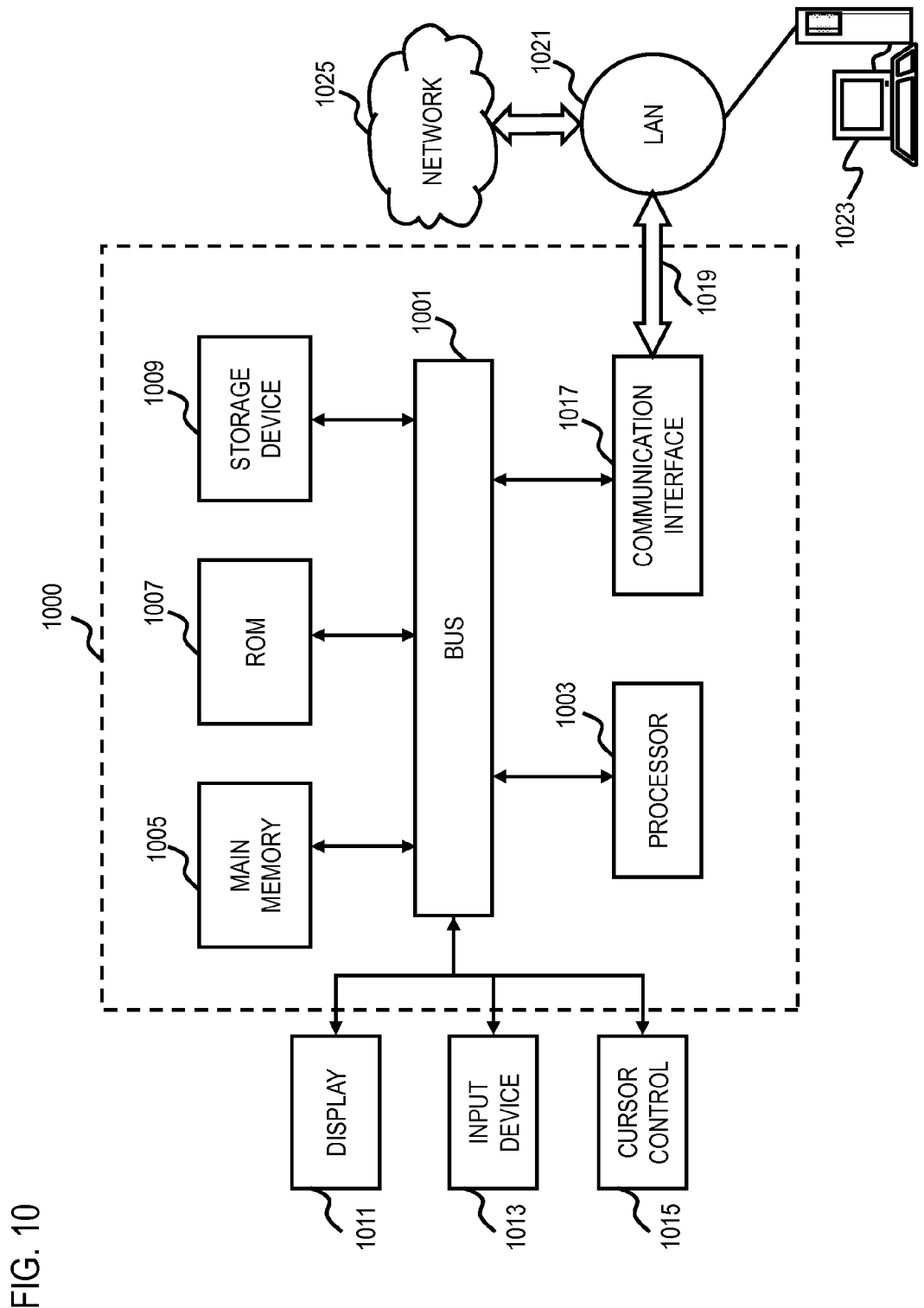
FIG. 10 is a diagram of a computer system that can be used to implement various exemplary embodiments.

FIG. 10 illustrates computing hardware (e.g., a computer system) upon which an embodiment according to the invention can be implemented to establish and/or utilize a wireless adhoc device to provide control over a set top box. The computer system 1000 includes a bus 1001 or other communication mechanism for communicating information and a processor 1003 coupled to the bus 1001 for processing information. The computer system 1000 also includes a main memory 1005, such as random access memory (RAM) or other dynamic storage device, coupled to the bus 1001 for storing information and instructions to be executed by the processor 1003. The main memory 1005 also can be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in the main memory 1005. Such instructions can be read into the main memory 1005 from another computer-readable medium, such as the storage device 1009. Execution of the arrangement of instructions contained in the main memory 1005 causes the processor 1003 to perform the process steps described herein. One or more processors in a multi-processing arrangement may also be employed to execute the instructions contained in the main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, the communication interface 1017 may be a local area network (LAN) card (e.g. For Ethernet™ or an Asynchronous Transfer Model (ATM) network) to provide a data communication connection to a compatible LAN. Wireless links can also be implemented. In any such implementation, the communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 9, multiple communication interfaces can also be employed.

The network link 1019 typically provides data communication through one or more networks to other data devices. For example, the network link 1019 may provide a connection through a local network 1021 to a host computer 1023, which has connectivity to a network 1025 (e.g. A wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as the main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
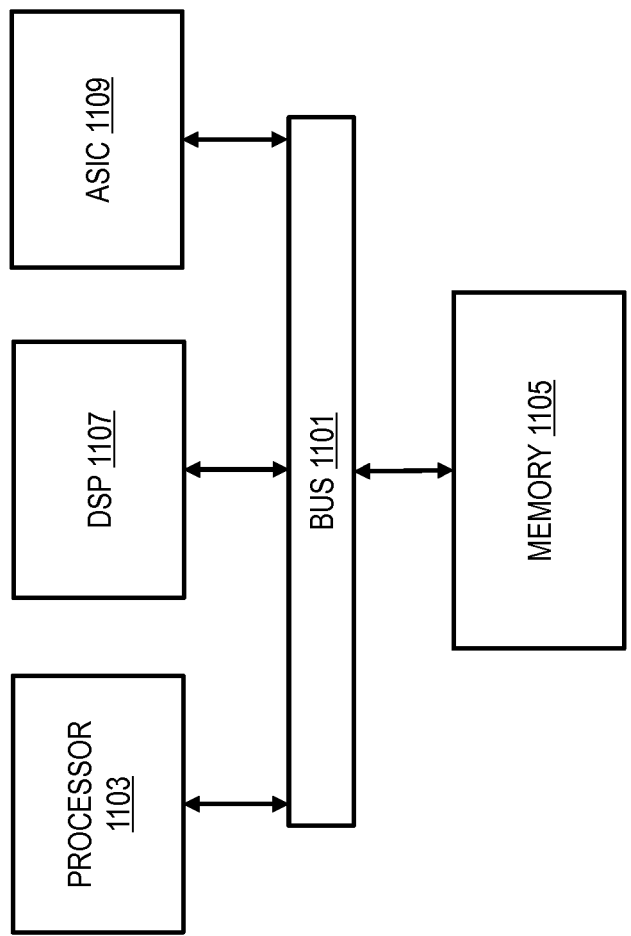
FIG. 11 is a diagram of a chip set that can be used to implement various exemplary embodiments.

FIG. 11 illustrates a chip set 1100 upon which an embodiment of the invention may be implemented. The chip set 1100 is programmed to establish and/or utilize a wireless adhoc device to provide control over a set top box as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. The chip set 1100, or a portion thereof, constitutes a means for performing one or more steps of FIGS. 2, 3, 7 and 8.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set top box based on device events. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:
1. A method comprising:
detecting, by a wireless device, a mobile terminal that is configured to control one or more set top boxes via a wireless local area network; and
controlling, by the wireless device, over an adhoc connection the one or more set top boxes directly or via the mobile terminal based on the detection of the mobile terminal,
wherein each set top box is connected to a display, and wherein said each set top box provides an indicator on or at the display regarding being controlled by the mobile terminal.

2. A method of claim 1, further comprising:
initiating a user datagram protocol broadcast within the wireless local area network to detect the one or more set top boxes or to perform the detection of the mobile terminal.

3. A method of claim 1, further comprising:
receiving, at the wireless device, a request from the mobile terminal or from the one or more set top boxes to authenticate the wireless device; and
receiving, at the wireless device, a response acknowledging the authentication from the mobile terminal or from the one or more set top boxes.

4. A method of claim 3, wherein the request is in compliance with a transmission control protocol.

5. A method of claim 1, further comprising:
storing, at the wireless device mapping information associated with mapping of commands of the one or more set top boxes to the mobile terminal and the wireless device.

6. A method of claim 5, further comprising:
generating, based on the mapping information, one or more control signals at the wireless device to control the one or more set top boxes over the adhoc connection.

7. A method of claim 5, further comprising:
receiving at the wireless device one or more notifications from the one or more set top boxes.

8. A method of claim 1, wherein the adhoc connection includes a short range wireless connection using either WiFi, Bluetooth, infrared, or a combination thereof.

9. A method comprising:
receiving a connection request from two or more mobile terminals or wireless devices by a set top box via a wireless local area network for an adhoc connection to the set-top box;
authenticating the two or more mobile terminals or wireless devices; and
generating a response acknowledging the authentication from the set top box for transmission to the two or more mobile terminals or wireless devices,
wherein the two or more mobile terminals or wireless devices are configured to control the set top box, and
wherein priority of controlling the set top box among the two or more mobile terminals or wireless devices is based upon a look-up table stored internally in the set top box.

10. A method of claim 9, further comprising:
receiving at the set top box a control signal from one wireless device via one mobile terminal or directly from the one wireless device; and
transmitting a notification from the set top box to the one mobile terminal or the one wireless device.

11. An apparatus comprising:
at least one processor; and
at least one memory including computer program code,
the at least one memory and the computer program code configured to, with the at least one processor, cause the apparatus to perform at least the following,
detect a mobile terminal that is configured to control one or more set top boxes via a wireless local area network; and
control over an adhoc connection the one or more set top boxes directly or via the mobile terminal based on the detection of the mobile terminal,
wherein each set top box is connected to a display, and
wherein said each set top box provides an indicator on or at the display regarding being controlled by the mobile terminal.

12. An apparatus according to claim 11, wherein the apparatus is further caused to:
initiate a user datagram protocol broadcast within the wireless local area network to detect the one or more set top boxes or to perform the detection of the mobile terminal.

13. An apparatus according to claim 11, wherein the apparatus is further caused to:
receive a request from the mobile terminal or from the one or more set top boxes to authenticate the wireless device; and
receive a response acknowledging the authentication from the mobile terminal or from the one or more set top boxes.

14. An apparatus according to claim 13, wherein the request is in compliance with a transmission control protocol.

15. An apparatus according to claim 11, wherein the apparatus is further caused to:
store, mapping information associated with mapping of commands of the one or more set top boxes to the mobile terminal and the wireless device.

16. An apparatus according to claim 15, wherein the apparatus is further caused to:
generate, based on the mapping information, one or more control signals to control the directly and indirectly controlled one or more set top boxes over the wireless local area network.

17. An apparatus according to claim 15, wherein the apparatus is further caused to:
receive one or more notifications from the one or more set top boxes.

18. An apparatus according to claim 11, wherein the adhoc connection includes a short range wireless connection using either WiFi, Bluetooth, infrared, or a combination thereof.

19. An apparatus comprising:
at least one processor; and
at least one memory including computer program code,
the at least one memory and the computer program code configured to, with the at least one processor, cause the apparatus to perform at least the following,
receive a connection request from two or more mobile terminals or wireless devices by a set top box via a wireless local area network for an adhoc connection to the set-top box;
authenticate the two or more mobile terminals or wireless devices; and
generating a response acknowledging the authentication from the set top box for transmission to the two or more mobile terminals or wireless devices,
wherein the two or more mobile terminals or wireless devices are configured to control the set top box, and
wherein priority of controlling the set top box among the two or more mobile terminals or wireless devices is based upon a look-up table stored internally in the set top box.

20. An apparatus according to claim 19, wherein the apparatus is further caused to:
receive a control signal from one wireless device via one mobile terminal or directly from the one wireless device; and
transmit a notification from the set top box to the one mobile terminal or the one wireless device.

* * * * *